UNITED STATES PATENT OFFICE.

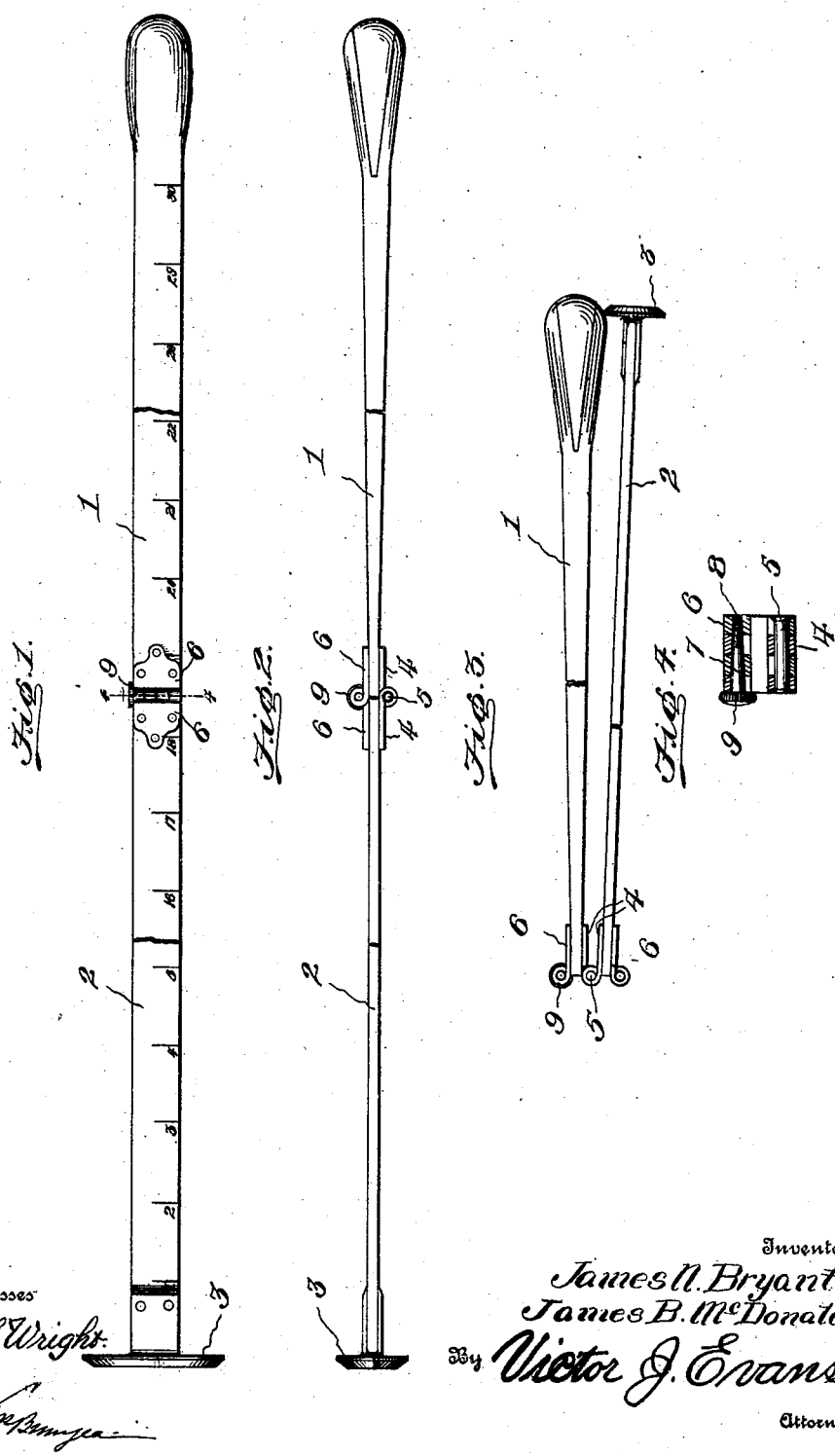

JAMES N. BRYANT AND JAMES B. McDONALD, OF NASHVILLE, TENNESSEE.

LUMBER-RULE.

No. 914,635.            Specification of Letters Patent.          Patented March 9, 1909.

Application filed July 26, 1907, Serial No. 385,682.    Renewed August 1, 1908.    Serial No. 446,410.

*To all whom it may concern:*

Be it known that we, JAMES N. BRYANT and JAMES B. McDONALD, citizens of the United States of America, residing at Nashville, in the county of Davidson and State of Tennessee, have invented new and useful Improvements in Lumber-Rules, of which the following is a specification.

This invention relates to lumber rules, and one of the principal objects of the same is to provide a lumber rule made in sections and connected together by hinged joints in order that the rule may be folded to occupy but small space in a traveling bag or other case.

Another object of the invention is to provide a lumber rule with a hinged joint provided with a removable pin so that the sections of the rule may be locked rigidly in alinement or folded one section upon the other by removing the pin.

These and other objects may be attained by means of the construction illustrated in the accompanying drawing, in which:

Figure 1 is a side elevation of a lumber rule made in accordance with our invention, said rule being broken away at two points. Fig. 2 is an edge view of the same, the rule being shown opened out. Fig. 3 is an edge view of the same showing the rule folded. Fig. 4 is a sectional view of the rule joint, on the line 4—4 of Fig. 1.

Referring to the drawing for a more particular description of our invention, the numeral 1 designates the handle section of the rule, and 2 is the head section thereof, 3 being the head. It is to be understood that in so far as the general structure of the rule is concerned, it may be of any desired construction or type, our invention residing wholly in the hinging of the sections in order that the rule may be folded, for the purpose described, and it will also be obvious that the rule may be made in two, three or more sections, if desired.

The sections of the rule are connected together by hinges, the members 4 of which are connected together upon one side of the rule by means of a permanent pintle 5 which may be headed up at the end, as shown in Fig. 4. Disposed upon the opposite side of the sections 1 and 2 the rule members 6 are detachably connected together by means of a tapering screw or pin 7, said screw having a series of threads 8 at the end thereof which engage interior screw threads in the hinge members 6, while the opposite end of the screw is provided with a milled head 9 by means of which the screw may be readily detached whenever it is required to fold the rule to the required length to be readily placed within a traveling bag or case.

From the foregoing it will be obvious that a rule made in accordance with our invention can be quickly folded in position for shipping or transportation, and that the various sections can be readily locked in alinement for use whenever required.

A rule made in accordance with our invention can be produced at comparatively slight cost, and has been found very desirable for scaling lumber and logs by persons required to move about from place to place.

The numerals indicating the scale will be stamped on the hinges as well as upon the sections of the rule, so as to permit the inspector to make rapid calculations. The hinges are to be of any desired length to secure strength.

Having thus described the invention, what we claim is:

1. A lumber rule made in sections and connected together by hinged members secured to opposite sides of said sections, one of said hinged members having a rigid pintle and the other hinged members having a detachable pin.

2. A lumber rule made in sections, said sections being connected together by oppositely disposed hinged members, one pair of hinged members being connected together by a permanent pintle, and the opposite hinged members being connected by a tapering threaded pin or screw having a milled head.

In testimony whereof, we affix our signatures in presence of two witnesses.

JAMES N. BRYANT.
               JAMES B. McDONALD.

Witnesses:
    J. J. BLAIR,
    R. G. VAUGHAN.